US010178528B2

(12) United States Patent
Arkko et al.

(10) Patent No.: US 10,178,528 B2
(45) Date of Patent: Jan. 8, 2019

(54) DEVICE CONNECTIVITY MANAGEMENT FOR MACHINE TYPE COMMUNICATIONS

(71) Applicant: Telefonaktiebolaget L M Ericsson (publ), Stockholm (SE)

(72) Inventors: Jari Arkko, Kauniainen (FI); Anders E. Eriksson, Kista (SE); Ari Keränen, Kirkkonummi (FI); Hans Bertil Rönneke, Kungsbacka (SE); Joachim Sachs, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 161 days.

(21) Appl. No.: 13/947,815

(22) Filed: Jul. 22, 2013

(65) Prior Publication Data
US 2014/0029515 A1 Jan. 30, 2014

Related U.S. Application Data

(60) Provisional application No. 61/676,503, filed on Jul. 27, 2012.

(51) Int. Cl.
*H04W 4/70* (2018.01)
*H04W 76/12* (2018.01)
(52) U.S. Cl.
CPC ............. *H04W 4/70* (2018.02); *H04W 76/12* (2018.02)
(58) Field of Classification Search
CPC .................................. H04W 4/70; H04W 76/12
See application file for complete search history.

(56) References Cited

U.S. PATENT DOCUMENTS

| 2002/0077134 | A1* | 6/2002 | Mizell et al. ................. 455/466 |
| 2003/0109272 | A1* | 6/2003 | Mousseau et al. ........... 455/517 |
| 2003/1092722 | | 6/2003 | Mousseau et al. |
| 2007/0162744 | A1* | 7/2007 | Hoshino ........... H04L 29/06027 713/156 |
| 2008/0256263 | A1* | 10/2008 | Nerst ................ H04L 29/08846 709/250 |
| 2010/0002606 | A1* | 1/2010 | Preis ................... H04L 65/1069 370/259 |

(Continued)

FOREIGN PATENT DOCUMENTS

| CN | 1618219 A | 5/2005 |
| WO | WO 2006/088947 A | 8/2006 |

OTHER PUBLICATIONS

International Search Report, PCT/SE2013/050926, dated Jan. 20, 2014, 9 pages.

(Continued)

*Primary Examiner* — Chirag G Shah
*Assistant Examiner* — Joshua Smith
(74) *Attorney, Agent, or Firm* — Sage Patent Group

(57) ABSTRACT

Methods for managing device connectivity of machine type communications devices include receiving a packet data protocol based command addressed to a Machine Type Communication (MTC) device, determining if the MTC device has an active packet data protocol context, in response to determining that the MTC device does not have an active packet data protocol context, activating a packet data protocol context for the MTC device, and forwarding the packet data protocol based command to the MTC device.

13 Claims, 6 Drawing Sheets

(56) References Cited

U.S. PATENT DOCUMENTS

| | | | | |
|---|---|---|---|---|
| 2012/0109952 A1* | 5/2012 | Reddy | H04L 67/1095 | 707/736 |
| 2012/0155380 A1* | 6/2012 | Hodges | H04L 12/1475 | 370/328 |
| 2012/0203825 A1* | 8/2012 | Choudhary | H04L 65/4076 | 709/203 |
| 2013/0136072 A1* | 5/2013 | Bachmann et al. | | 370/329 |
| 2013/0195016 A1* | 8/2013 | Jamadagni et al. | | 370/328 |
| 2013/0196698 A1* | 8/2013 | Lee | H04W 4/18 | 455/466 |
| 2013/0279372 A1* | 10/2013 | Jain | H04L 27/2675 | 370/254 |
| 2013/0308564 A1* | 11/2013 | Jain et al. | | 370/329 |
| 2013/0329653 A1* | 12/2013 | Russell, Jr. | H04W 4/005 | 370/329 |
| 2014/0089478 A1* | 3/2014 | Seed | H04W 4/005 | 709/222 |
| 2014/0128113 A1* | 5/2014 | Zisimopoulos et al. | | 455/466 |
| 2014/0155056 A1* | 6/2014 | Jactat et al. | | 455/422.1 |
| 2015/0012744 A1* | 1/2015 | Chen | H04L 9/0869 | 713/155 |

OTHER PUBLICATIONS

Chinese 1$^{st}$ Office Action dated Oct. 10, 2017 for corresponding CN application No. 201380050647.9; Translation of Office Action; pp. 1-3.

* cited by examiner

DEVICE CONNECTIVITY MANAGEMENT FOR MACHINE TYPE COMMUNICATIONS

CLAIM OF PRIORITY

The present application claims the benefit of and priority to U.S. Provisional Patent Application No. 61/676,503, filed Jul. 27, 2012, entitled "DEVICE CONNECTIVITY MANAGEMENT FOR MACHINE TYPE COMMUNICATIONS," the disclosure of which is hereby incorporated herein by reference in its entirety.

FIELD

The present inventive concepts relate to managing connectivity of devices in communications networks, and in particular to managing connectivity in communications networks of devices configured for machine-type communications.

BACKGROUND

1. Description of Machine Type Communications

The field of communications has generally focused on the development of technologies that facilitate communication between human beings, or between devices that are operated or controlled by human beings. For example, the field of telephony, both wired and wireless, was developed to facilitate voice communication between human beings. As such, these communication technologies employ transmission media, transmission equipment, transmission protocols, and even billing and management structures that are designed to efficiently and profitably carry human-centric communication traffic.

Machine Type Communications (MTC), or Machine-to-Machine (M2M) communications, refers to communication between machines with no, or only limited, human involvement. Typically, MTC is used to collect data from remotely deployed "smart" devices. The collected data can be processed at a centralized location that may be far away from the devices that collected the data. MTC thus has a number of important applications, such as remote monitoring, remote metering, asset tracking, automation, toll collection, emission management, and many others.

Many MTC applications may also benefit from the use of wireless communication networks as the communication medium, as it may be cost-prohibitive, and in some cases impossible, to run physical wires to MTC devices. Thus, in recent years, wireless communication networks that were designed, developed and managed to carry primarily human-centric traffic, such as voice traffic, have been utilized to carry MTC traffic. Integrating MTC traffic into conventional wireless telephony networks has proven to be a challenge for a number of reasons, including the differences in the type, frequency and amount of data typically transmitted by MTC devices and in the sheer number of MTC devices expected to be deployed.

2. Evolved Universal Terrestrial Radio Access Network

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for user equipment nodes (UEs).

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

3. Definition of Service Capability Server

A typical layout of an MTC system 100 is illustrated in FIG. 1. As shown therein, an MTC system can be logically divided into a Device Domain, a Network Domain, and an Application Domain. One or more MTC devices 22A-22C are deployed in the Device Domain. The MTC devices 22A-22C may collect data and/or perform other operations at various remote locations. The MTC devices 22A-22C may be connected together in an MTC area network 24, for example, through an MTC gateway 20. In some cases, the MTC devices 22A-22C may be connected together in a peer-to-peer network that does not include a gateway. In other cases, the MTC devices 22A-22C may not be connected or communicate with each other at all.

An MTC application 30 resides in the Application Domain. The MTC application 30 communicates with the MTC devices 22A-22C through a network 10 in the Network Domain. The network 10 may include any type of communication network, including wired and/or wireless data communication networks, packet switched communication networks, circuit switched communication networks, etc. However, as noted above, wireless communication networks may be particularly suitable for MTC applications.

The MTC application 30 may collect data from or transmit data or instructions to the MTC devices 22A-22C. A user may access the collected data using a client application 32 that interfaces with the MTC application 30.

Recently, the 3GPP has defined a new node, the Service Capability Server 12, that assists in communicating with the MTC devices. Currently, there is no exact definition on what kinds of functions the Service Capability Server may perform, and no interface specifications. Note that the Service Capability Server is also sometimes referred to as an "MTC Server" in ETSI terminology, and may also be referred to by that name in the E-UTRAN context.

SUMMARY

Embodiments of the present inventive concepts provide device connectivity management for machine type communication (MTC) devices.

Methods according to some embodiments include receiving a packet data protocol based command addressed to an MTC device, determining if the MTC device has an active packet data protocol context, in response to determining that the MTC device does not have an active packet data protocol context, activating a packet data protocol context for the MTC device, and forwarding the packet data protocol based command to the MTC device.

Activating the packet data protocol context for the MTC device may include sending a message to the MTC device via a communication mechanism that does not require an active packed data protocol context instructing the MTC device to establish the packet data protocol context.

Sending the message to the MTC device via the communication mechanism may include sending a short message service (SMS) or multimedia message service (MMS) message to the MTC device.

The packet data protocol based command may include a hypertext transfer protocol command. The packet data protocol context may be established in response to IP/TCP/HTTP protocol based message or an IP/UDP/COAP protocol based message.

Determining if the MTC device has an active packet data protocol context may include sending a packet data protocol based command to the MTC device through a packet data communications network, and checking for an error message from the packet data communications network.

Receiving the packet data protocol based command addressed to the MTC device may include monitoring network traffic in a packet data communications network to which the MTC device is connected.

Monitoring network traffic may include monitoring traffic sent to a predefined IP address, IP address prefix, and/or web address for traffic addressed to the MTC device.

Monitoring network traffic may include monitoring domain name service (DNS) queries to a DNS server for a name associated with the MTC device, and activating the packet data protocol context for the MTC device may include sending a message to the MTC device via a communication mechanism that does not require an active packed data protocol context instructing the MTC device to establish a packet data protocol context in response to detecting the DNS query corresponding to the MTC device name.

The methods may further include sending a response to the packet data protocol based command addressed to the MTC device before the packet data protocol context for the MTC device is activated.

Methods according to further embodiments include receiving from a machine type communication (MTC) application a packet data protocol based command addressed to an MTC device, determining if the MTC device has an active packet data protocol context by transmitting the request to a packet data communication network to which the MTC device is connected and receiving a response from the network indicating whether or not the MTC device has an active packet data protocol context, and in response to determining that the MTC device does not have an active packet data protocol context, activating an active packet data protocol context for the MTC device and forwarding the packet data protocol based command to the MTC device.

The methods may further include receiving a response to the packet data protocol command, and forwarding the response to the MTC application.

Activating the packet data protocol context for the MTC device may include sending a message to the MTC device via a data protocol based communication mechanism that does not require an active packed data protocol context instructing the MTC device to establish a packet data protocol context.

The methods may further include determining that the packet data protocol context was successfully activated, and in response to determining that the packet data protocol context was successfully activated, forwarding the packet data protocol based command to the MTC device.

Some embodiments provide a network node including a processor, a packet data communication interface coupled to the processor, and a non-packet data communication interface coupled to the processor. The packet data communication interface may be configured to receive a packet data protocol based command addressed to a machine type communication (MTC) device. The processor may be configured to determine if the MTC device has an active packet data protocol context, and in response to determining that the MTC device does not have an active packet data protocol context, to activate a packet data protocol context for the MTC device using the non-packet data communication interface and to forward the packet data protocol based command to the MTC device using the packet data communication interface.

The processor may be configured to activate the packet data protocol context for the MTC device by sending a message to the MTC device using a data communication protocol that does not require an active packed data protocol context instructing the MTC device to establish a packet data protocol context.

The processor may be further configured to send a short message service (SMS) or multimedia message service (MMS) message to the MTC device instructing the MTC device to establish the packet data protocol context.

The processor may be further configured to determine if the MTC device has an active packet data protocol context by sending a packet data protocol based command to the MTC device through a packet data communications network and checking for an error message from the packet data communications network in response to the packet data protocol based command.

The processor may be configured to monitor network traffic in a packet data communications network to which the MTC device is connected for traffic addressed to the MTC device, the network traffic including traffic sent to a predefined IP address, IP address prefix and/or web address, and/or domain name service (DNS) queries to a DNS server for a name associated with the MTC device.

The processor may be further configured to send a response to the packet data protocol based command addressed to the MTC device before the packet data protocol context for the MTC device is activated.

It is noted that aspects of the inventive concepts described with respect to one embodiment may be incorporated in a different embodiments although not specifically described relative thereto. That is, all embodiments and/or features of any embodiments can be combined in any way and /or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present inventive concepts, and be protected by the accompanying claims.

BRIEF DESCRIPTION OF THE DRAWINGS

The accompanying drawings are included to provide a further understanding of the disclosure and are incorporated in and constitute a part of this application. In the drawings.

DESCRIPTION OF EMBODIMENTS

Embodiments of the present inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art.

According to some embodiments, a Service Capability Server is configured to assist in managing connectivity to MTC devices through a wireless communications network, such as an E-UTRAN network. In particular, a Service Capability Server according to some embodiments can assist with the establishment of communications with MTC devices that may not be constantly connected (i.e., "always on") at the IP level. That is, a Service Capability Server according to some devices may be configured to assist with establishing connection to devices that do not always maintain an active packet data protocol (PDP) context.

As mobile network equipment is generally dimensioned and priced per number of PDP contexts that it can support at the same time, operators have expressed concerns for keeping all MTC devices in connected mode at all times. An MTC device that does not have an active PDP context may nevertheless be connected to a communications network, such as an E-UTRAN network, and can communicate using other data communication protocols. For example, an E-UTRAN connected device can be contacted by sending SMS messages to the device, asking/instructing it to establish a PDP context.

Sending SMS messages to the MTC device and monitoring the reception of the SMS messages is likely to consume some amount of energy from the device, just as if it was already in connected mode and capable of receiving IP packets. However, the cost of operating an MTC device may be reduced if it is not required to maintain a PDP context at all times. Accordingly, a Service Capability Server according to some embodiments may be used to manage the connectivity of MTC devices so that they do not have to maintain a PDP context at all times.

Figure 1:
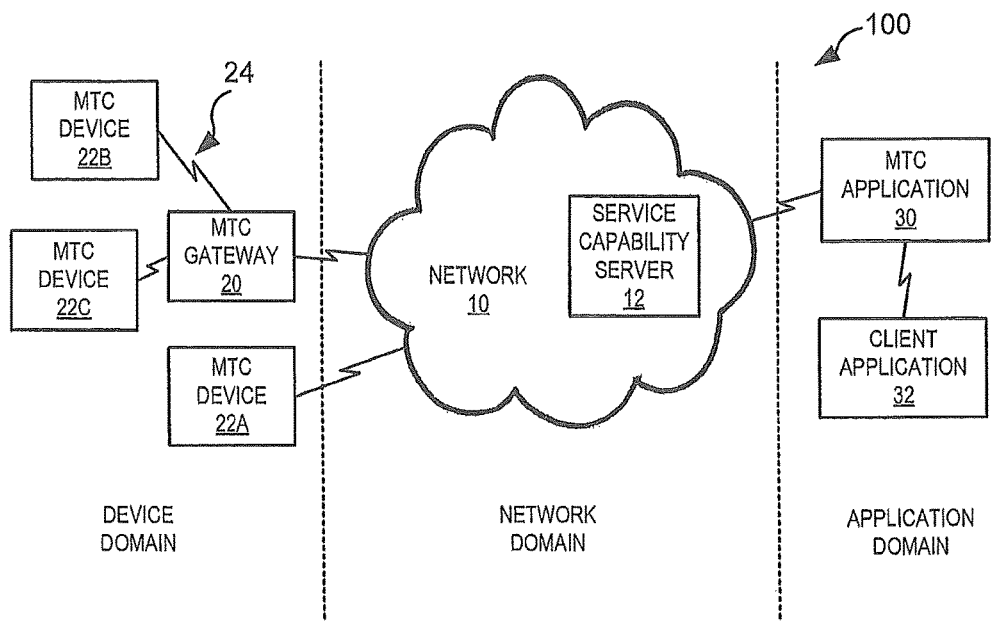
FIG. 1 is a block diagram that illustrates a typical layout of a machine type communication (MTC) system.
Figure 2:
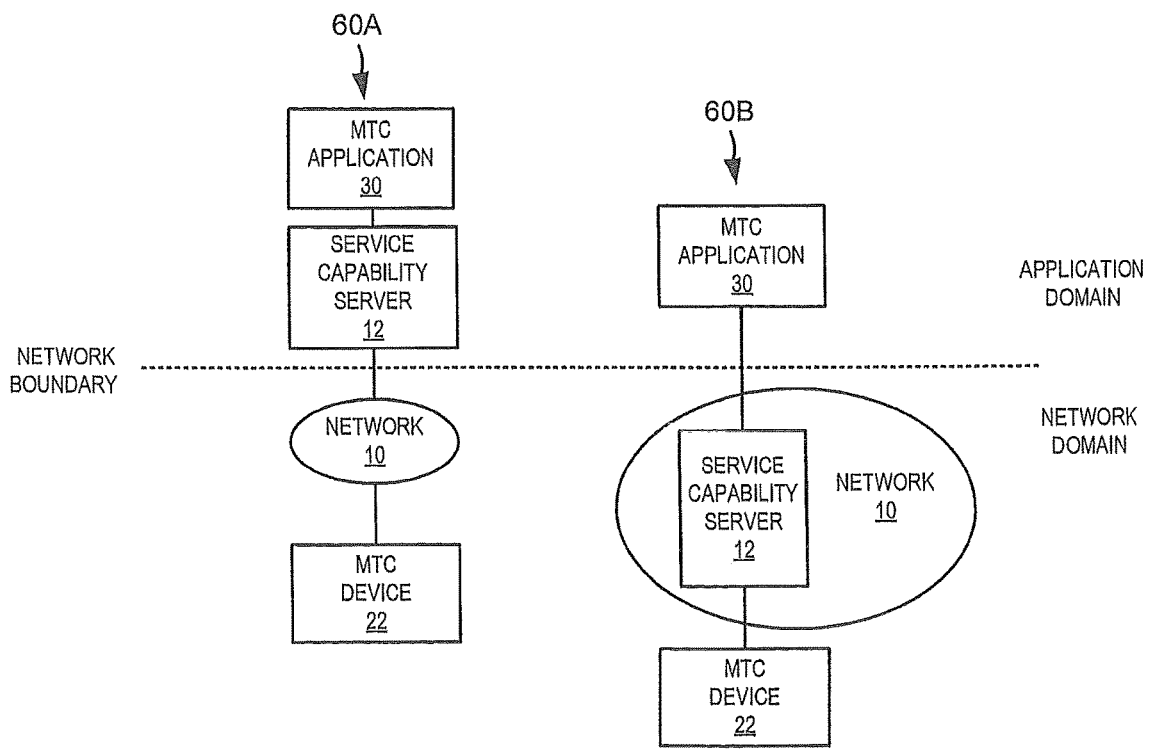
FIG. 2 is a block diagram that illustrates a machine type communication system according to some embodiments in which a Service Capability Server resides in the Application Domain.

Although illustrated in FIG. 1 as residing in the network domain, and thus controlled by the network operator, a Service Capability Server 12 may reside in the Application Domain. For example, as shown in FIG. 2, in a first model 60A, a Service Capability Server 12 resides in the Application Domain and provides an interface between the MTC application 30 and the network 10. As the Service Capability Server 12 is in the Application Domain in the model 60A, it is operated by the MTC service provider. In a second model 60B, the Service Capability Server 12 is located in the Network Domain, and is thus operated by the network operator.

Other possible functions for the Service Capability Server 12 include acting as web services proxy, performing protocol conversion, acting as a directory service node that knows the IP addresses, names, etc., of various devices.

Under the definition proposed by 3GPP, it is expected that a Service Capability Server 12 will offer application programming interfaces (APIs) towards MTC applications 30 and towards the E-UTRAN network 10. Thus, both MTC applications 30 and the E-UTRAN network 10 may be able to issue commands to the Service Capability Server 12. Such a model may require MTC applications 30 to be aware of the APIs, as opposed to merely interacting with the MTC device 22 with using HTTP protocol commands or other communications mechanisms. Such a model may also not be appropriate for models in which the Service Capability Server 12 is operated by the network service provider, as the network service provider may not wish to expose the API of the Service Capability Server 12 to applications that it does not control.

Embodiments of the present invention provide specific details for this control, and define a communications model that allows applications to be unaware of the Service Capability Server 12. In particular, according to some embodiments, the Service Capability Server 12 may allow an MTC application 30 to communicate with an MTC device 22 by creating the illusion that the MTC device 22 is an always-connected device by employing state information from the E-UTRAN network and wake-up mechanisms built on top of SMS.

For example, the Service Capability Server 12 may act as a transparent web cache on the path towards the MTC device 22. For MTC devices 22 that are in connected mode, web traffic from the MTC application 30 directed to the MTC device 22 can simply be allowed to flow via the E-UTRAN network to the device 22. For devices that are disconnected, the Service Capability Server 12 can intercept the communications, send out a wake-up SMS to the MTC device 22, and forward the web traffic to the MTC device 22 after a small delay during which the MTC device 22 wakes up and establishes an active PDP context.

Figure 3:
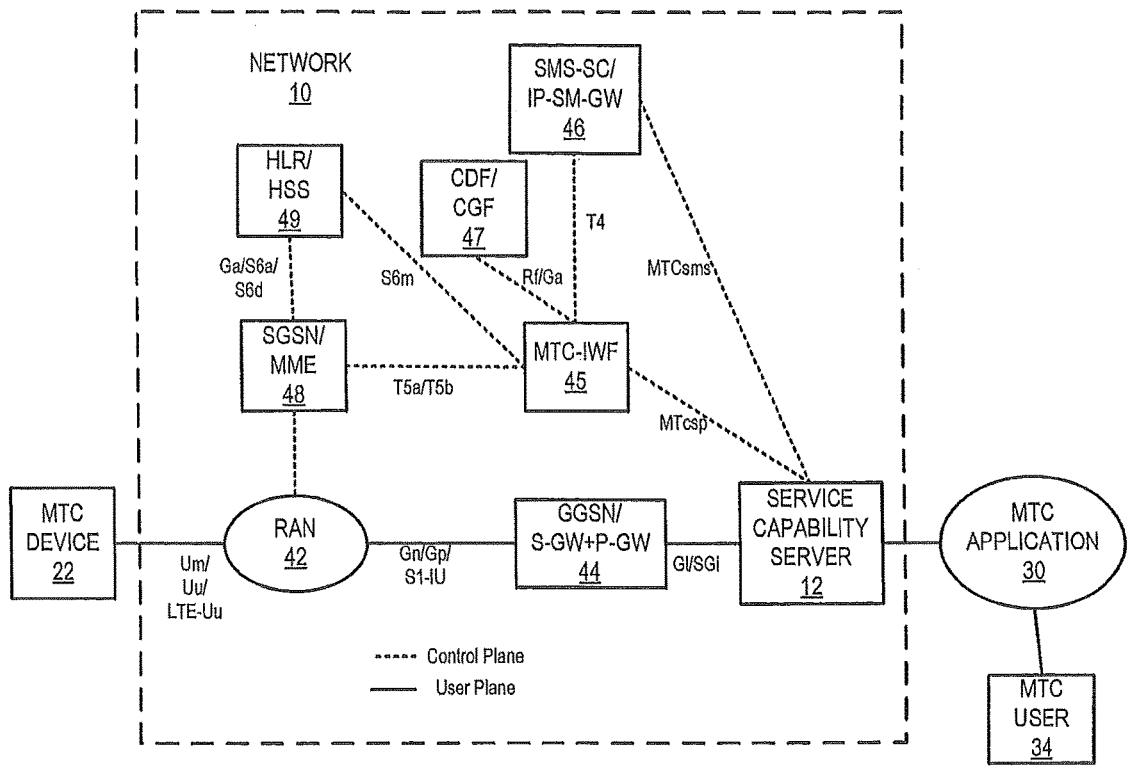
FIG. 3 is a block diagram that illustrates a machine type communication system according to some embodiments including an MTC device, an MTC application, and an E-UTRAN network.

Referring to FIG. 3, an MTC device 22, an MTC application 30 and an E-UTRAN network 10 are illustrated in more detail. As shown therein, the E-UTRAN network 10 includes a Service Capability Server 12. The Service Capability Server provides an access point to the network 10 for an MTC application 30 that is accessible by an MTC user 34. Although illustrated as being part of the network 10, it will be appreciated that the Service Capability Server 12 could be implemented outside the network domain as discussed above.

The MTC device 22 is connected to the network 10 through a radio access network (RAN) 42. The Service Capability Server 12 is connected to the RAN 42 through a gateway GPRS Support Node (GGSN) 44. "GPRS" refers to General Packet Radio Service, which is a protocol that enables transmission of packet data within the network 10. Accordingly, packet data can be communicated through the RAN 42 to the MTC device 22 through the GGSN 44, provided that the MTC device 22 has an active PDP context.

The RAN 42, GGSN 44 and Service Capability Server 12 are all connected on the user plane of the E-UTRAN network, which is the portion of the network that carries user data. The E-UTRAN network also includes a control plane including the nodes connected by dashed lines in FIG. 3. The 3GPP standard defines a number of nodes in the control plane, along with protocols by which the nodes communicate. For example, as shown in FIG. 3, the control plane includes a Home Location Register/Home Subscriber Server (HLR/HSS) 49 that maintains subscriber profiles in the network 10, an SMS service center (SMS-SC) 46 that manages SMS traffic in the network and that may also include an IP-SMS gateway (IP-SM-GW), an MTC interworking function (MTC-IWF) 45, a Charging Data Function/Charging Gateway Function (CDF/CGF) 47 that generates charging data records based on charging events in the network, and a Serving GPRS Support Node (SGSN) 48 that may also include a mobility management entity (MME). An SGSN-MME 48 provides packet-data switching and mobility/session management in GSM, WCDMA and LTE networks.

SMS messages are carried in the control plane of the E-UTRAN network 10. The Service Capability Server 12 communicates with the SMS-SC 46 using the MTCsms interface, and communicates with the MTC-IWF using the MTCsp interface. In the user plane, the MTC application 30 may communicate with the MTC device 22 using a web services packet-based protocol stack, such as IP/TCP/HTTP or IP/UDP/COAP.

The Service Capability Server 12 may act on behalf of the MTC application 30 as a "middlebox" that can provide IP routing, network address translation (NAT), firewall, transparent web proxy, and/or non-transparent proxy functionality.

As a "middlebox," the Service Capability Server 12 can observe and intercept traffic to/from the MTC device 22, and according to the present inventive concepts is capable of observing and changing the connectivity status of the MTC device 22.

Figure 4:
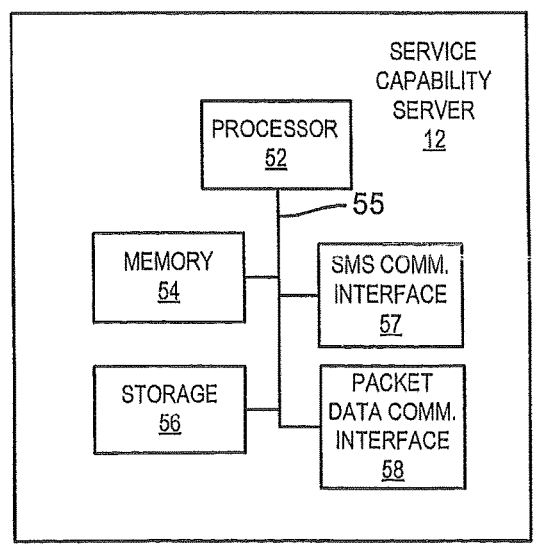
FIG. 4 is a block diagram of a Service Capability Server according to some embodiments.

FIG. 4 is a block diagram of a Service Capability Server 12. The Service Capability Server 12 includes a processor 52 that controls operation of the Service Capability Server 12. A bus 55 connects the processor 52 to a memory 54, such as a RAM, cache memory, or other volatile or non-volatile memory, a storage device 56, an SMS communication interface 57, and a packet data communication interface 58. The packet data communication interface 58 may support communications between the Service Capability Server 12 and the MTC application 30, as well as between the Service Capability Server 12 and the GGSN 44. The SMS communication interface 57 may support communications between the Service Capability Server 12 and the SMS-SC 46 within the network 10.

A web transaction sent to an MTC device 22 may be allowed to go through unchanged when the MTC device 22 is in connected mode. Otherwise, the Service Capability Server 12 may instruct the E-UTRAN network 10 and/or the MTC device 22 to bring up IP connectivity, i.e., to initiate a PDP context. Once the network 10 confirms that the connectivity exists (or a small delay has passed), the transaction is allowed to be sent forward.

Figure 5:
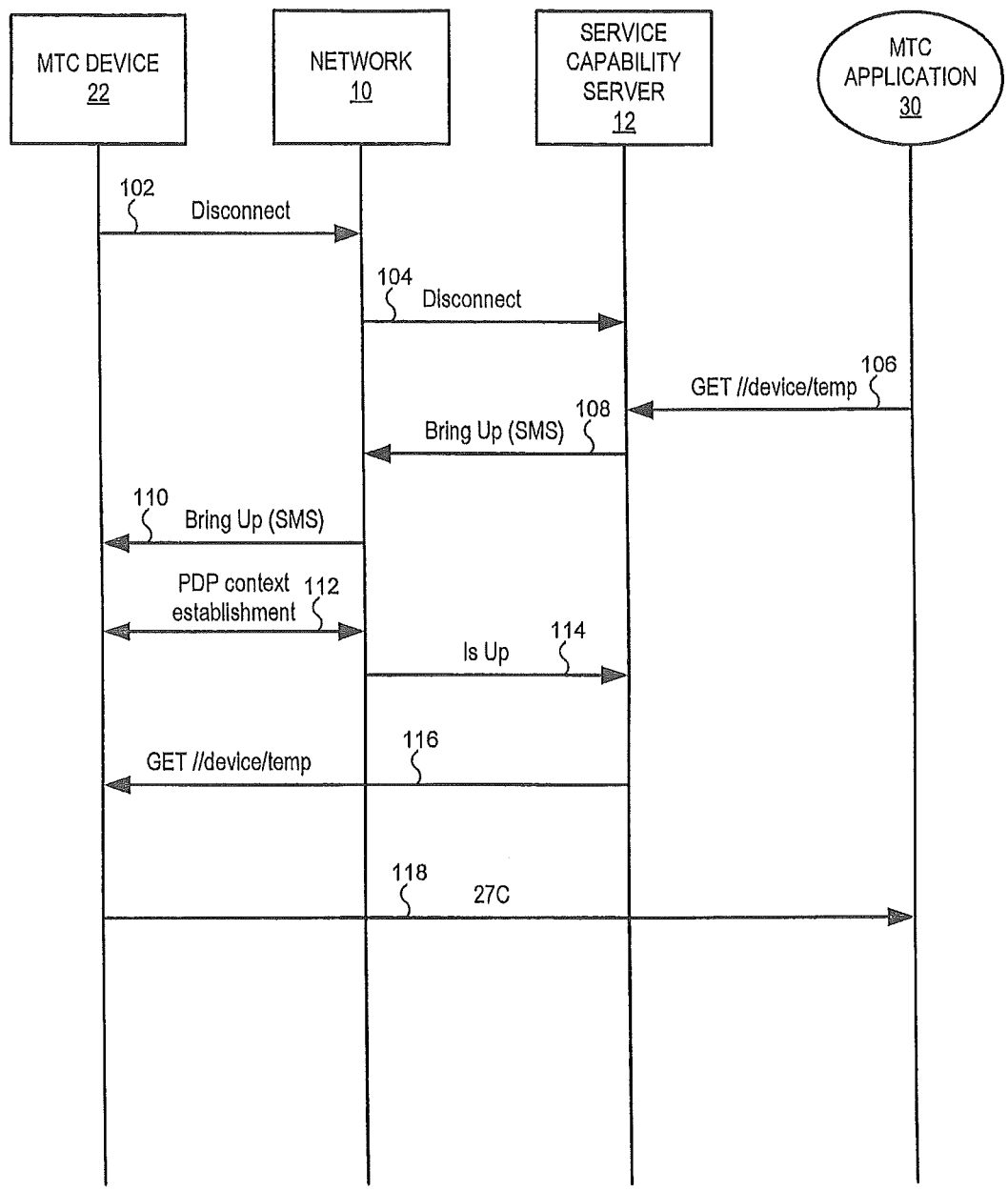
FIG. 5 illustrates an exemplary message sequence in an MTC system according to some embodiments.

For example, FIG. 5 illustrates an exemplary message sequence that may occur when an MTC application 30 wants to send a command to an MTC device that may or may not have an active PDP context. As shown therein, an MTC device 22 that has an active PDP context may issue a disconnect request 102 to the network 10. The network 10 may notify the Service Capability Server 12 of the disconnect request, or may simply forward the disconnect request 104 to the Service Capability Server 12. At this point, the Service Capability Server 12 may be aware that the MTC device 22 does not have an active PDP context. Next, the Service Capability Server 12 receives an HTTP command 106, such as "GET //device/temp" from the MTC application that is directed to the MTC device 22. Because the Service Capability Server 12 is aware that the MTC device 22 does not have an active PDP context, the Service Capability Server 12 may send an SMS command "Bring Up (SMS)" 108 to the MTC device via the SMS protocol in the network control plane. The network 10 forwards the "Bring Up (SMS)" command 110 to the MTC device 22, which in response establishes a PDP context 112 through the network 10. An "Is Up" response 114 is then sent to the Service Capability Server 12 to notify the Service Capability Server 12 that an active PDP context has been established for the MTC device 22. The Service Capability Server 12 may then forward the HTTP command "GET //device/temp" 116 to the MTC device 22 through the user plane of the network using a packet-based protocol.

The MTC device 22 may then respond to the GET command with an appropriate 27C response 118 to the MTC application 30.

Figure 6:
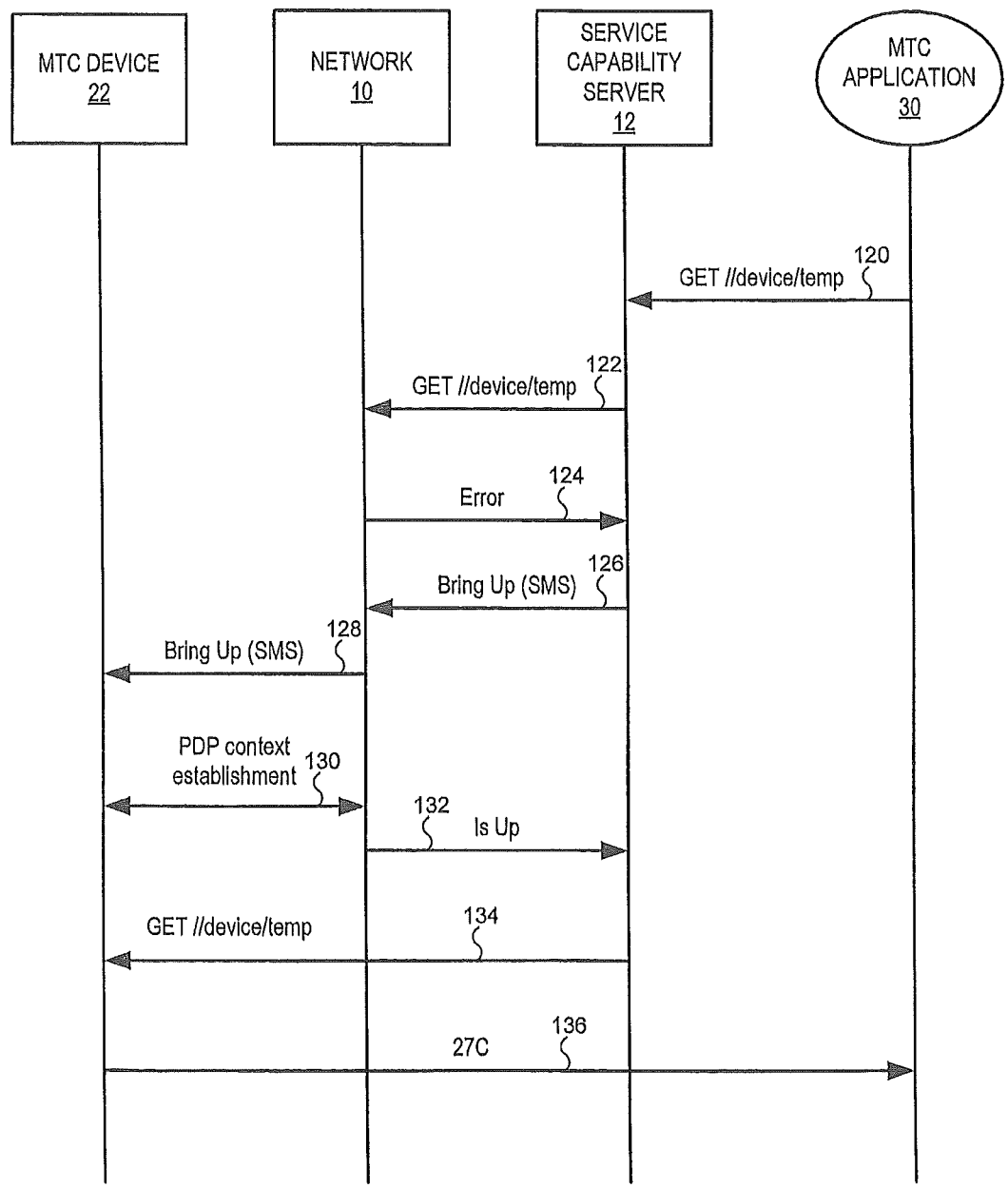
FIG. 6 is a message sequence that illustrates operations of a Service Capability Server 12 according to some embodiments.

FIG. 6 is a message sequence diagram that illustrates operations of a Service Capability Server 12 according to further embodiments. As shown therein, the Service Capability Server 12 may receive an HTTP command 120, such as "GET //device/temp" from the MTC application that is directed to the MTC device 22. In this case, however, the Service Capability Server 12 may be unaware of the current status of the MTC device 22. The Service Capability Server may attempt to forward the HTTP command 122 to the MTC device 22. However, if the MTC device 22 does not have an active PDP context, the network 10 may respond to the Service Capability Server 12 with an error message 124 informing the Service Capability Server 12 that the MTC device 22 is not active. In response, the Service Capability Server 12 may send an SMS command "Bring Up (SMS)" 126 to the MTC device via the SMS protocol in the network control plane. The network 10 forwards the "Bring Up (SMS)" command 128 to the MTC device 22, which in response establishes a PDP context 130 through the network 10. An "Is Up" response 132 is then sent to the Service Capability Server 12 to notify the Service Capability Server 12 that an active PDP context has been established for the MTC device 22. The Service Capability Server 12 may then forward the HTTP command "GET //device/temp" 134 to the MTC device 22 through the user plane of the network using a packet-based protocol. The MTC device 22 may then respond to the GET command with an appropriate 27C response 136 to the MTC application 30.

The approaches illustrated in FIGS. 5 and 6 can be implemented at various protocol layers using various mechanisms. In particular, the approaches could run on the IP layer by intercepting traffic to a given IP address or prefix, on the DNS naming layer by intercepting domain name service (DNS) queries to a particular name (e.g., device123.example.com), checking the status of the device and waking it up, and responding to the DNS query, and/or on the web layer by intercepting web traffic to a particular IP address or prefix.

The Service Capability Server 12 can also act as a non-transparent web proxy that receives web transactions to a given URI (e.g., GET //device123.example.com/temp) and then forwards those to the MTC device 22 based on its state and address. The Service Capability Server 12 can also respond to the original request on its own (e.g., using a cached value) while the MTC device 22 is coming up.

In addition, it may be desirable to add a firewall filtering functionality to the Service Capability Server 12. The MTC device owner may not want random unwanted traffic from the Internet to reach the MTC device 22. Specific devices may be indicated as supporting only specific protocols and/or ports (or even traffic sources), allowing other traffic to be dropped.

Embodiments of the invention may make it easy to program MTC applications, without requiring specialized APIs or agreements with the network operator. In addition, embodiments of the invention can make it possible to combine unwanted traffic filtering for MTC devices along with MTC connectivity management.

Figure 7:
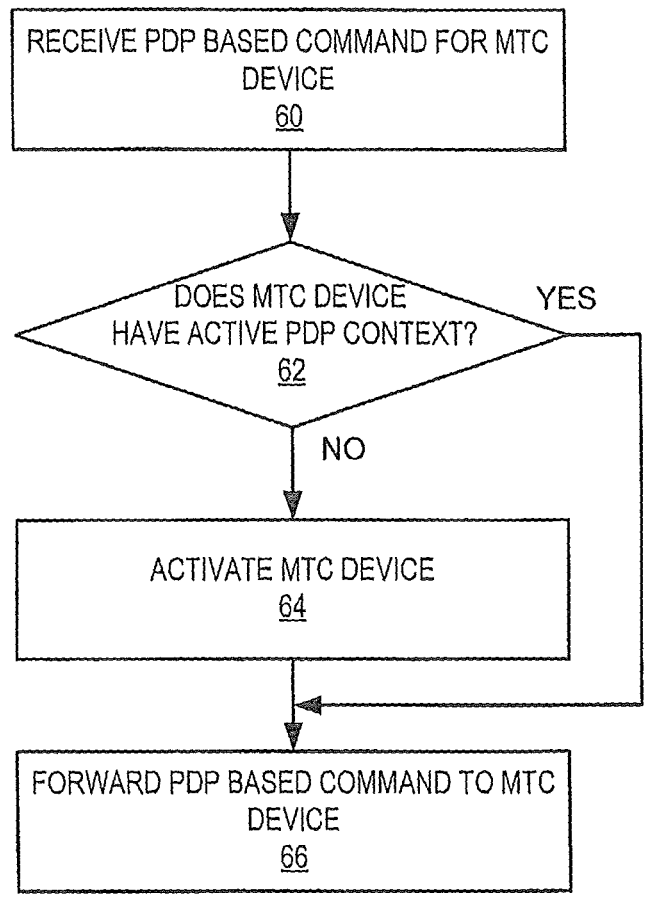
FIG. 7 is a flow diagram that illustrates a method of managing connectivity of an MTC device according to some embodiments.
Figure 8:
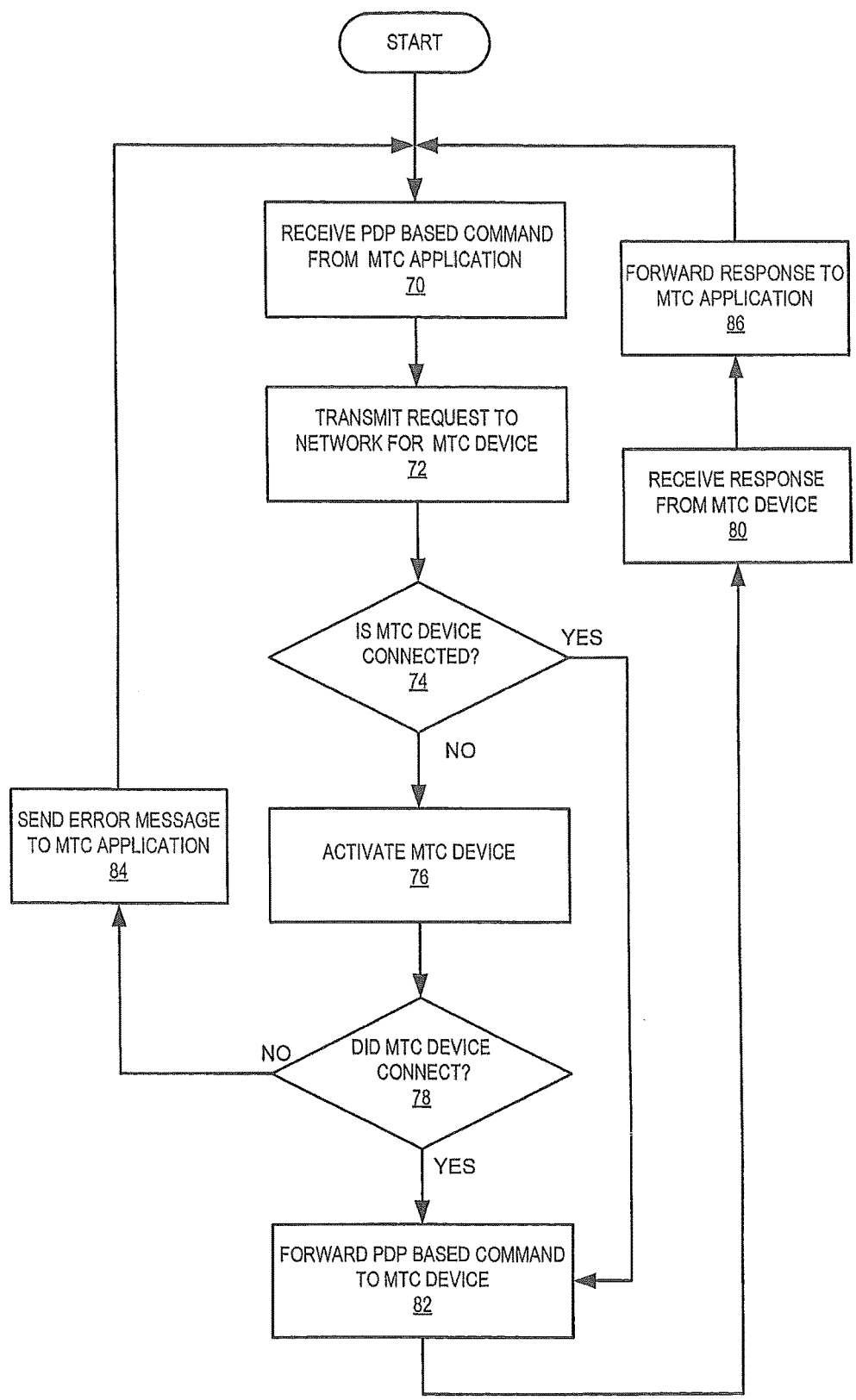
FIG. 8 is a flow diagram that illustrates a method of managing connectivity of an MTC device according to further embodiments.

Operations according to some embodiments are illustrated in FIGS. 7 and 8. Referring to FIG. 7, a method of managing connectivity of a machine-type communication (MTC) device includes receiving a packet data protocol based command addressed to the MTC device (block 60) and determining if the MTC device has an active packet data protocol context (block 62). In response to determining that the MTC device does not have an active packet data protocol context, the method includes activating the MTC device (block 64), for example, by sending a message to the MTC device via a communication mechanism that does not require an active packed data protocol context instructing the MTC device to establish a packet data protocol context, and forwarding the packet data protocol based command to the MTC device (block 66).

The packet data protocol based command may include, for example, a hypertext transfer protocol command. The packet data protocol context may be established in response to an IP/TCP/HTTP protocol based message or an IP/UDP/COAP protocol based message.

Sending a message to the MTC device via the communication mechanism may include sending a short message service (SMS) or multimedia message service (MMS) message to the MTC device.

Determining if the MTC device has an active packet data protocol context may include sending a packet data protocol based command to the MTC device through a packet data communications network and checking for an error message from the packet data communications network.

Receiving the packet data protocol based command addressed to the MTC device may include monitoring network traffic in a packet data communications network to which the MTC device is connected. In particular, traffic sent to a predefined IP address, IP address prefix, and/or web address may be monitored for traffic addressed to the MTC device.

In some embodiments, domain name service (DNS) queries to a DNS server for a name associated with the MTC device may be monitored, and the MTC device may be activated by sending a message to the MTC device via a communication mechanism that does not require an active packed data protocol context instructing the MTC device to establish a packet data protocol context in response to detecting a DNS query corresponding to the MTC device name.

Some embodiments further include sending a response to the packet data protocol based command addressed to the MTC device while the MTC device is being activated, i.e., before the packet data protocol context for the MTC device is activated.

Referring to FIG. 8, in some embodiments, the methods may include receiving a packet data protocol based command addressed to the MTC device (block 70) and determining if the MTC device has an active packet data protocol context. This may be done by transmitting the request to a packet data communication network to which the MTC device is connected (block 72) and checking for a response from the network indicating whether or not the MTC device is connected, i.e., has an active PDP context. If the device is connected, the PDP based command is forwarded to the MTC device (block 82). A response to the PDP based command is received from the MTC device (block 80) and forwarded to the MTC application (block 86).

If the MTC device is not connected, i.e., the MTC device does not have an active packet data protocol context, the method includes activating the MTC device (block 76), for example, by sending a message to the MTC device via a communication that does not require an active packed data protocol context mechanism instructing the MTC device to establish a packet data protocol context. A check is then made to determine if the activation is successful (block 78). If the activation is successful, the packet data protocol based command is forwarded to the MTC device (block 82). A response to the PDP based command is received from the MTC device (block 80) and forwarded to the MTC application (block 86). Otherwise, an error message is returned to the MTC application (block 84).

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of the invention will be or become apparent to one with skill in the art upon review of the present drawings and description. It is intended that all such additional network elements, devices, and/or methods be included within this description, be within the scope of the present invention, and be protected by the accompanying claims. Moreover, it is intended that all embodiments disclosed herein can be implemented separately or combined in any way and/or combination.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

That which is claimed is:

1. A method performed by a service capability server operating in a machine-type communication (MTC) network, the method comprising:
   intercepting a query, from a machine type communication (MTC) application server of the MTC network directed to a domain name server, for a domain name associated with a remote MTC device operating in the MTC network;
   in response to intercepting the query directed to the domain name server, determining whether the remote MTC device has an active packet data protocol context in the MTC network;
   in response to determining that the remote MTC device does not have an active packet data protocol context in the MTC network:
     sending one of a short message service (SMS) and a multimedia message service (MMS) message to the remote MTC device comprising an instruction to activate a packet data protocol context for the remote MTC device in the MTC network;
     responding to packet data protocol context commands received from the MTC application server on behalf of the remote MTC device before the remote MTC device activates the packet data protocol context;
     receiving an indication that the remote MTC device has activated the packet data protocol context; and
     responsive to receiving the indication, forwarding packet data protocol context commands from the MTC application server to the remote MTC device via the activated packet data protocol context; and
   in response to determining that the remote MTC device does have an active packet data protocol context in the MTC network, forwarding packet data protocol context commands from the MTC application server to the remote MTC device via the activated packet data protocol context.

2. The method of claim 1, wherein responding to packet data protocol context commands received from the MTC application server on behalf of the remote MTC device before the remote MTC device activates the packet data protocol context comprises responding to the packet data protocol commands received from the MTC application server using cached information associated with the remote MTC device.

3. The method of claim 1, wherein the packet data protocol context is established in response to an IP/TCP/HTTP protocol based message or an IP/UDP/COAP protocol based message.

4. The method of claim 1, wherein determining whether the remote MTC device has an active packet data protocol context comprises:
   sending a packet data protocol based command to the remote MTC device through a packet data communications network of the MTC network;
   responsive to sending the packet data protocol command to the remote MTC device, checking for an error message from the packet data communications network; and
   in response to receiving an error message from the packet data communications network, determining that the remote MTC device does not have an active packet data protocol context in the MTC network.

5. The method of claim 1, further comprises:
   intercepting web network traffic directed to the remote MTC device operating in a packet data communications network of the MTC network; and
   forwarding the intercepted web network traffic to the remote MTC device via the active packet data protocol context.

6. The method of claim 5, wherein intercepting the web network traffic comprises monitoring the web network traffic sent to a predefined IP address, IP address prefix, and/or web address for the web network traffic addressed to the remote MTC device.

7. A method performed by a service capability server operating in a machine-type communication (MTC) network, the method comprising
   intercepting a packet data based command, from a MTC application server operating in the MTC network, addressed to an IP address prefix or domain name of a remote machine type communication (MTC) device;
   identifying the remote MTC device corresponding to the IP address prefix or the domain name;
   in response to identifying the remote MTC device, determining whether the remote MTC device has an active packet data protocol context by transmitting a request to a packet data communication network of the MTC network to which the remote MTC device is connected and receiving a response from the packet data communication network comprising a first indication of whether or not the remote MTC device has an active packet data protocol context established; and
   in response to determining that the first indication indicates that the remote MTC device does not have an active packet data protocol context:
      activating an active packet data protocol context for the remote MTC device, wherein activating the active packet data protocol context for the remote MTC device comprises sending one of a short message service (SMS) and a multimedia message service (MMS) message to the remote MTC device via a communication mechanism, the message comprising an instruction causing the remote MTC device to activate a packet data protocol context;
      responding to the intercepted packet data protocol context command on behalf of the remote MTC device before the remote MTC device activates the packet data protocol context;
      receiving a second indication that the remote MTC device has activated the packet data protocol context; and
      responsive to receiving the second indication, forwarding packet data protocol context commands from the MTC application server to the remote MTC device via the activated packet data protocol context; and
   in response to determining that the remote MTC device does have an active packet data protocol context in the MTC network, forwarding the intercepted packet data based command to the remote MTC device via the established active packet data protocol context.

8. The method of claim 7, further comprising:
   receiving a response to the packet data based command from the remote MTC device via the active packet data protocol context; and
   forwarding the response to an MTC application server operating in the MTC network.

9. The method of claim 7, further comprising
   forwarding the intercepted packet data based command to the remote MTC device via the established active packet data protocol context in response to receiving the indication that the remote MTC device has activated the packet data protocol context.

10. A service capability network node operating in a machine-type communication (MTC) network, the service capability network node comprising:
   a processor;
   a packet data communication interface coupled to the processor; and
   a non-packet data communication interface coupled to the processor;
   wherein the packet data communication interface is configured to intercept a packet data based command, from a MTC application server operating in the MTC network, addressed to an IP address prefix or domain name of a remote machine type communication (MTC) device, and
   wherein the processor is configured to perform operations comprising:
   identifying the remote MTC device corresponding to the IP address prefix or the domain name;
   in response to identifying the remote MTC device, determining whether the remote MTC device has an active packet data protocol context by transmitting a request to a packet data communication network of the MTC network to which the remote MTC device is connected and receiving a response from the packet data communication network comprising a first indication of whether or not the remote MTC device has an active packet data protocol context established; and
   in response to determining that the first indication indicates that the remote MTC device does not have an active packet data protocol context:
      activating an active packet data protocol context for the remote MTC device, wherein activating the active packet data protocol context for the remote MTC device comprises sending one of a short message service (SMS) and a multimedia message service (MMS) message to the remote MTC device via a communication mechanism, the message comprising an instruction causing the remote MTC device to activate a packet data protocol context;

responding to the intercepted packet data protocol context command on behalf of the remote MTC device before the remote MTC device activates the packet data protocol context;

receiving a second indication that the remote MTC device has activated the packet data protocol context; and responsive to receiving the second indication, forwarding packet data protocol context commands from the MTC application server to the remote MTC device via the activated packet data protocol context; and in response to determining that the remote MTC device does have an active packet data protocol context in the MTC network, forwarding the intercepted packet data based command to the remote MTC device via the established active packet data protocol context.

11. The network node of claim 10, wherein the processor is further configured to respond to the intercepted packet data protocol context command on behalf of the remote MTC device before the remote MTC device activates the packet data protocol context by responding to the packet data protocol commands received from the MTC application server using cached information associated with the remote MTC device.

12. The network node of claim 10, wherein the processor is further configured to:

determine if the MTC device has an active packet data protocol context by sending a packet data protocol based command to the remote MTC device through a packet data communications network of the MTC network; and responsive to sending the packet data protocol based command, checking for an error message from the packet data communications network in response to the packet data based command; and determine that the remote MTC device does not have an active packet data protocol context in the MTC network in response to a reception of an error message from the packet data communications network.

13. The network node of claim 10, wherein the processor is configured to monitor network traffic in a packet data communications network to which the remote MTC device is connected for web traffic addressed to the remote MTC device, the network traffic including web traffic sent to a predefined IP address, IP address prefix and/or web address, and/or domain name service (DNS) queries to a DNS server for a name associated with the remote MTC device.

* * * * *